United States Patent [19]

Vereschagin et al.

[11] 4,142,869

[45] Mar. 6, 1979

[54] COMPACT-GRAINED DIAMOND MATERIAL

[76] Inventors: Leonid F. Vereschagin, Kutuzovsky prospekt, 2/1, kv. 231; Aik A. Semerchan, Kutuzovsky prospekt, 2/1, kv. 205, both of Moscow; Tamara T. Gankevich, Podolsky raion, Akademgorodok, ulitsa Shkolnaya, 6, kv. 16, Moskovskaya oblast; Mikhail E. Dmitriev, Podolsky raion, Akademgorodok, ulitsa Shkolnaya, 4, kv. 64, Moskovskaya oblast; Vitaly P. Modenov, Podolsky raion, Akademgorodok, ulitsa Tsentralnaya, 10, kv. 42, Moskovskaya oblast, all of U.S.S.R.

[21] Appl. No.: 780,189

[22] Filed: Mar. 22, 1977

Related U.S. Application Data

[63] Continuation of Ser. No. 534,155, Dec. 18, 1974, abandoned.

[30] Foreign Application Priority Data

Dec. 29, 1973 [SU] U.S.S.R. .............................. 1980906

[51] Int. Cl.² .......................... B24D 3/06; B05D 7/00
[52] U.S. Cl. ....................................... 51/295; 51/307; 51/309
[58] Field of Search ......................... 51/295, 309, 307

[56] References Cited

U.S. PATENT DOCUMENTS

| | | | |
|---|---|---|---|
| 3,293,012 | 12/1966 | Smiley et al. | 51/293 |
| 3,356,473 | 12/1967 | Hull et al. | 51/309 |
| 3,650,714 | 3/1972 | Farkas | 51/295 |
| 3,820,966 | 6/1974 | Sejbal et al. | 51/309 |
| 3,871,840 | 3/1975 | Wilder et al. | 51/295 |
| 3,879,901 | 4/1975 | Caveney | 51/295 |
| 3,924,031 | 12/1975 | Nicholas et al. | 51/295 |
| 3,929,432 | 12/1975 | Caveney | 51/295 |

*Primary Examiner*—Donald J. Arnold
*Attorney, Agent, or Firm*—Steinberg & Blake

[57] ABSTRACT

The proposed compact-grained diamond material consisting of powdered diamond particles is characterized in that the diamond particles therein are coated with a titanium carbide or zirconium carbide film, which film forms a cellular structure over the entire body of the material, and are bound with copper-titanium intermetallides filling the spacing between said diamond particles.

7 Claims, No Drawings

COMPACT-GRAINED DIAMOND MATERIAL

This is a continuation of application Ser. No. 534,155, filed Dec. 18, 1974 and now abandoned.

The present invention relates to the manufacture of compact-grained diamond materials with a high diamond content. These materials possess excellent abrasive properties and are intended for machining hard and brittle materials such as glass, ceramics and refractory materials, as well as for rock drilling, etc. Some varieties of said compact-grained diamond materials may be used for manufacturing components that are subject to compression or friction wear.

Such diamond materials are produced by caking diamond powder, which forms the base of the material, and a binder which is distributed between the diamond particles and bonds them to one another. In these materials the diamond powder content amounts to more than half of the entire volume of the material; a substantial portion of the diamond particles are in direct contact with one another.

Thus, the materials under review differ substantially from the commonly used diamond abrasives with organic, metal or refractory binders, wherein diamond crystals do not constitute more than 50 percent of the material's volume, are uniformly distributed over the binder which should be referred to in this context as base or matrix) and are out of contact with one another.

The known compact-grained diamond materials are characterized in that the diamond powder content therein amounts to ≧ 50 percent by weight of the material, the rest being a metal binder.

In these materials the following binders are used:

(a) pure metal or non-metal elements of the periodic systems: Ni, Co, Fe, Ru, Ro, Pd, Os, Sr, Pt, Cr, Ti, Ta, V, B, Mc, Si, Be;

(b) titanium- or zirconium-based alloys comprising the following alloying additions: Si, Ni, Co, Mg, Cr, Fe;

(c) refractory carbides, borides or nitrides of titanium, molybdenum, tantalum, tungsten and other carbide-forming elements.

The compact-grained diamond materials comprising the above-mentioned components do not possess a sufficiently high abrasive resistance which is one or two orders less than that of individual diamond crystals. This is due to the properties of the binders used in said materials and the nature of the interaction between the binder and the diamond particles. For example, the binders of group (a) acquire plastic properties with a slight rise in the temperature due to their friction against the material being machined; as a result, their binding properties deteriorate. This equally applies to diamond materials comprising binders of group (b). In these materials the proportion of alloying additions is insignificant (for instance, the Ti:Si ratio is 34.4:3.2), so that the mechanical strength of the binder is determined by the metal which constitutes the base of the binder, in the given case, titanium. Finally, the diamond materials comprising carbides, borides and nitrides as a binder are too brittle, although they are less sensitive to heating. This is due to the fact that carbide, boride and nitride binders are extremely hard, not easily deformable and are poor fillers in the course of caking, as they are not fusible at normal caking temperatures. Hence, the low effectiveness of such binders.

The foregoing disadvantages account for the fact that in the course of machining a substantial portion of diamond particles is torn away or falls out from the diamond material long before its complete wear, so that the abrasive resistance of the material is lower than the maximum possible resistance.

It is an object of the present invention to raise the strength and abrasive resistance of compact-grained diamond materials by introducing into the diamond base binders to form such a structure of the diamond material which assures reliable binding of diamond particles to one another and maintains that binding under service conditions.

The foregoing object is attained by providing a compact-grained diamond material comprising powdered diamond particles bound by a metal binder filling the spacing between the diamond particles, wherein, in accordance with the invention, the function of the metal binder is performed by copper-titanium or copper-zirconium intermetallides or their mixtures, whereas the diamond particles, which form the base of the diamond material, are coated with a titanium or zirconium carbide film which forms an uninterrupted cellular structure over the entire volume of the material.

In the proposed material the diamond powder content, i.e. the diamond particle content is equal to or greater than 65 percent by volume.

The size of the diamond particles is between 1 and 400 microns.

The term "intermetallide" stands for chemical compounds, for example, $Ti_2Cu$, $TiCu$, $Ti_2Cu_3$, $TiCu_3$, $Zr_2Cu$, $ZrCu$, $Zr_2Cu_3$, $ZrCu_3$, whose composition is stoichiometric or close to stoichiometric. The composition range of each intermetallide is known from structural diagrams of copper-titanium or copper-zirconium intermetallides found in reference literature.

Copper-titanium and copper-zirconium intermetallides fuse under pressure at temperatures from 1,000° to 1,200° C. Consequently, at normal diamond powder caking temperatures they are in liquid state and thus well impregnate the diamond base, in contrast to carbide, boride and nitride binders which remain solid at said caking temperatures and only form a mechanical mixture with diamond powder.

At the same time, copper-titanium and copper-zirconium intermetallides lose their strength in solid state only when heated to high temperatures of 800° to 900° C. It should be pointed out in this connection that metals normally used for binding diamond crystals lose their strength at temperatures between 500° and 600° C. Due to a comparatively high weakening temperature of the binder, the proposed compact-grained diamond material is less wearable when being heated as a result of friction against a material being machined, such as glass, stone, ceramics, etc.

An important feature of the proposed compact-grained diamond material comprising copper-titanium and copper-zirconium binders is the presence therein of thin films of titanium or zirconium carbide, which films coat individual diamond particles constituting the material. Such films are formed at temperatures of 1,000° to 1,200°C, and under a pressure of 10 to 30 kilobars as a result of diamond carbon saturating a layer of a molten copper-titanium or copper-zirconium binder contacting with diamond crystals. After crystallization this binder layer turns into a carbide film, which fact has been corroborated by X-ray and electron microscopic examination. Throughout the entire volume of the compact-grained diamond material the carbide films form an uninterrupted cellular structure which effectively binds diamond crystals and thus gives an extra strength to the material.

As a result, the abrasive resistance of the proposed compact-grained diamond material of the foregoing composition and structure is two to three times greater than that of compact-grained diamond materials with the nickel binders.

Owing to good binding properties of the above-mentioned intermetallide, the cubic content of diamond crystals in the proposed materials may be upward of 65 percent.

The intermetallide binder effectively holds both big and small diamond crystals, so that the proposed material may contain diamond particles of any grain size between 1 and 400 microns. The material maybe produced on the basis of diamond powder of the same grain size; it may also comprise diamond powders having different grain sizes.

The selection of the grain size of diamond particles is determined by the purpose of the material. Coarse-grained materials are preferable for rough machining of hard and brittle materials with a considerable stock removal in one cutting stroke. Fine-grained materials are preferable for finish machining of the same materials or for manufacturing precision components (for example, those for precision instruments) which are subject to compression and wear.

The process of manufacturing the proposed compact-grained diamond material is as follows. Diamond powder is placed in a graphite container. Intermetallide binder is put in the same container in the form of a compact slug or cake compressed from chips of said intermetallide. The intermetallide binder may be a mixture of two intermetallides, for example, $Ti_2Cu+TiCu$. The binder slug or cake is so placed with respect to the diamond powder that both are continuously in contact with each other.

The optimum volume ratio between the diamond powder and binder is between 80:20 and 70:30, although other ratios are possible, with a proviso that the diamond content is equal to or higher than 65 percent of the volume of the material. The graphite container and its contents are placed in a high-pressure chamber where a pressure upward of 1 kilobar is developed. Under this pressure the container and its contents are heated to a temperature sufficient to melt the binder. The molten binder impregnates the compressed diamond powder and is at the same time saturated with diamond carbon. The process is continued during 0.5 to 1 minute, after which the heating is stopped and the pressure is gradually brought down to normal (this takes 2 to 3 minutes to avoid the cracking of the baked material).

It should be noted that due to a high cubic concentration of diamond particles the proposed material does not easily lends itself to machining. It is expedient therefore that the material be given the desired shape and size during the process of its production. A desired shape may be obtained by employing ceramic molds installed in the graphite container prior to putting diamond powder therein. This object may also be attained by appropriately shaping the inner surface of the graphite container which may be spherical, octahedral, etc. This shape is reproduced by the compact-grained diamond matwrial as it is being caked under pressure.

The invention will be better understood from the following examples of preferred embodiments thereof.

EXAMPLE 1

Diamond powder having a grain size of 250 microns is placed in a graphite container. Intermetallide binder is placed in the same container, which binder is the copper-titanium intermetallide $Ti_2Cu$. The binder is introduced in the form of a cake compressed from chips of the copper-titanium intermetallide $Ti_2Cu$. Said metal binder is placed in the container above and in contact with the diamond powder. The latter is introduced in an amount of about 70 percent by volume; hence, the metal binder is introduced in an amount of 30 percent by volume. The container and its contents are placed in a high-pressure chamber of an apparatus for diamond material production. The caking of the diamond powder and metal binder is effected at a pressure of 5 kilobars and a temperature of 1,200° C. during 1 minute. The material thus produced has an abrasive resistance of fifteen to thirty thousand units and is used for manufacturing stone work tools. Phase X-ray analysis carried out in combination with electron microscopic examination reveals that the diamond material consists of diamond particles coated with an uninterrupted titanium carbide film, whereas the spacing between the diamond particles is filled with the copper-titanium intermetallide.

EXAMPLE 2

A compact-grained diamond material is produced from diamond powder with a grain size of 5 microns as described in Example 1. The metal binder in this case is a mixture of intermetallides $Ti_2Cu$ + $TiCu$. The caking is carried out at a pressure of 30 kilobars and a temperature of 1,150° C. The material thus obtained has a compression strength of 500 kg/mm$^2$ and an elastic modulus of about 55,000 kg/mm$^2$. It is used for manufacturing high-pressure dies.

EXAMPLE 3

A compact-grained diamond material is produced as in Example 1 from diamond powder having a grain size of 40 microns. The metal binder is a mixture of titanium-zirconium intermetallides $Zr_2Cu$ + $ZrCu$. The caking is done at a pressure of 10 kilobars and a temperature of 1,250° C. The material thus produced has a structure and properties similar to those of the material of Example 1.

What is claimed is:

1. Method of producing a diamond based compact abrasive material consisting essentially of diamond particles all of which are coated with a titanium carbide or zirconium carbide film, which film forms an uninterrupted cellular structure throughout the entire volume of the diamond particles, the thus carbide-coated diamond particles being bound into a compact mass by substantially stoichiometric copper-titanium or copper-zirconium intermetallides filling the spacing between said carbide-coated diamond particles, which comprises subjecting diamond particles and a compact body of said intermetallide in a container to a temperature of 1000°–1200° C. and a pressure of 10–30 kilobars to melt said intermetallide, whereby the intermetallide impregnates the diamond particles and is simultaneously saturated with the diamond carbon forming a film of the corresponding titanium or zirconium carbide on the diamond, and gradually reducing the temperature and pressure, thus obtaining said diamond based compact abrasive material.

2. Method according to claim 1, wherein the cubic content of said diamond particles is equal to or higher than 65 percent.

3. Method according to claim 1, wherein the diamond particles have sizes between 1 and 400 microns.

4. Method according to claim 1 wherein the volume of the diamond particles is between 70 and 80 percent.

5. Method according to claim 1 wherein said intermetallide is copper-titanium.

6. Method according to claim 1 wherein said intermetallide is copper-zirconium.

7. The diamond based compact abrasive material produced according to the method of claim 1.

* * * * *